United States Patent

[11] 3,542,175

| [72] | Inventors | Gordon C. Olson;<br>Raymond C. Schneider; Leonard H.<br>Adams, Rockford, Illinois |
|---|---|---|
| [21] | Appl. No. | 787,169 |
| [22] | Filed | Dec. 26, 1968 |
| [45] | Patented | Nov. 24, 1970 |
| [73] | Assignee | Twin Disc Incorporated<br>Racine, Wisconsin<br>a corporation of Wisconsin |

[54] TORQUE CONVERTER AND CLUTCH WITH FLUID PRESSURE CONTROLS
6 Claims, 5 Drawing Figs.

[52] U.S. Cl. .................................................. 192/3.33, 192/104, 192/109
[51] Int. Cl. .................................................. F16d 47/06
[50] Field of Search .................................................. 192/3.33, 3.23

[56] References Cited
UNITED STATES PATENTS

| 3,202,018 | 8/1965 | Hilpert | 192/3.33X |
| 3,326,066 | 6/1967 | Murphy | 192/3.33X |
| 3,368,656 | 2/1968 | Hilpert | 192/3.33X |
| 3,384,209 | 5/1968 | Murphy | 192/3.33X |

*Primary Examiner*—Benjamin W. Wyche
*Attorney*—James E. Nilles

ABSTRACT: A hydrodynamic transmission having a control system including a torque converter and a modulated friction clutch ahead of the torque converter, and means for controlling the internal pressure of the converter and consequently its retarding capacity.

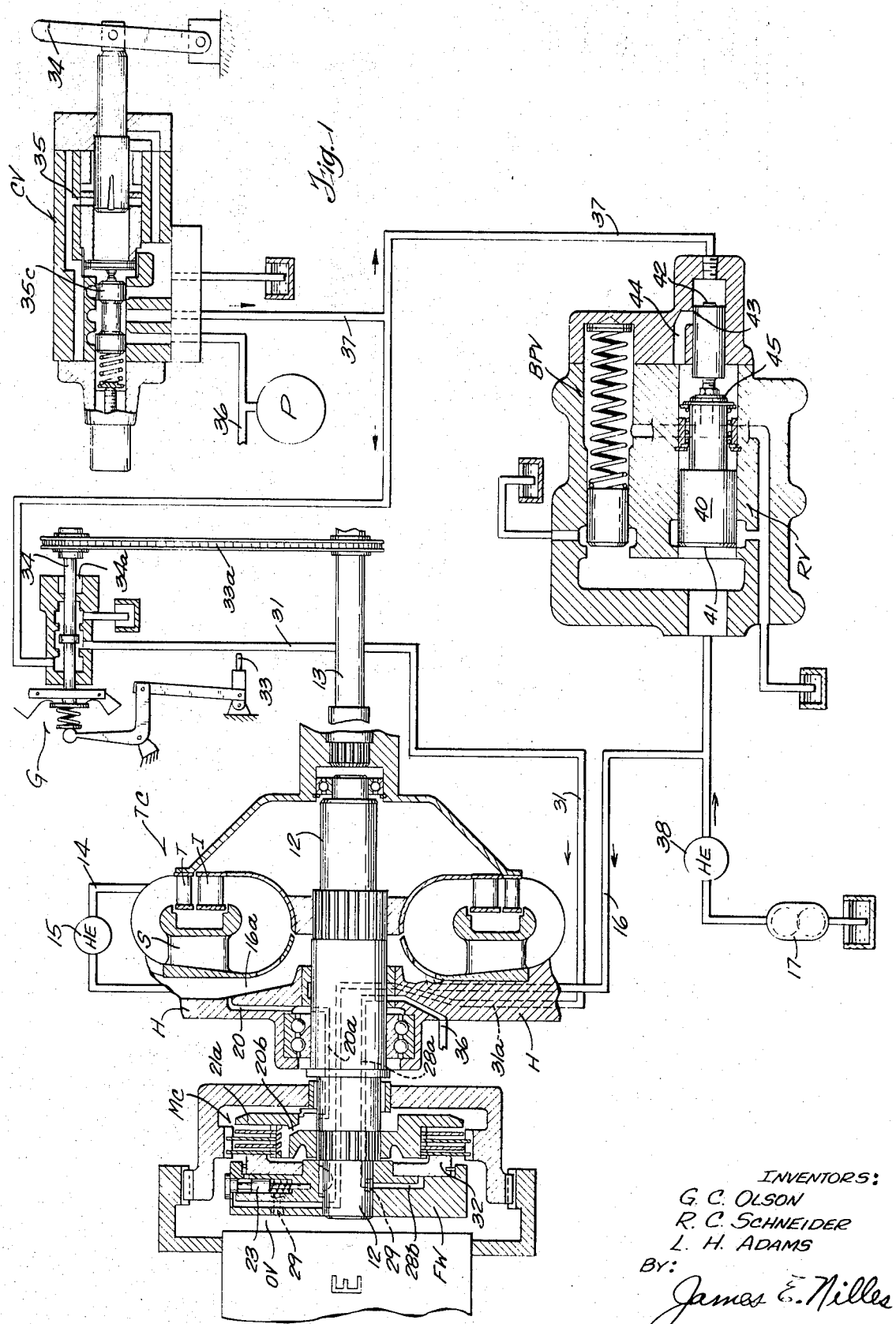

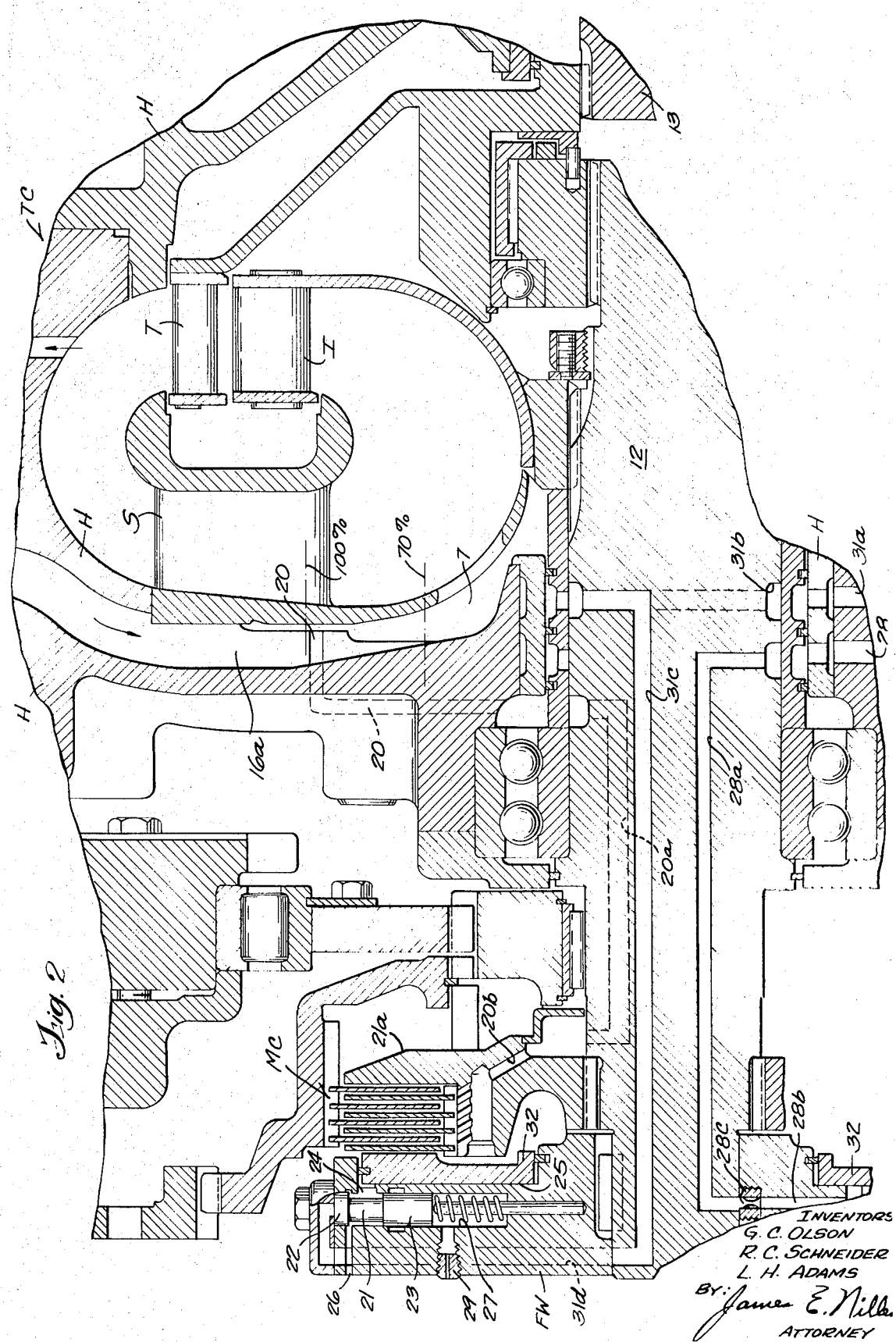

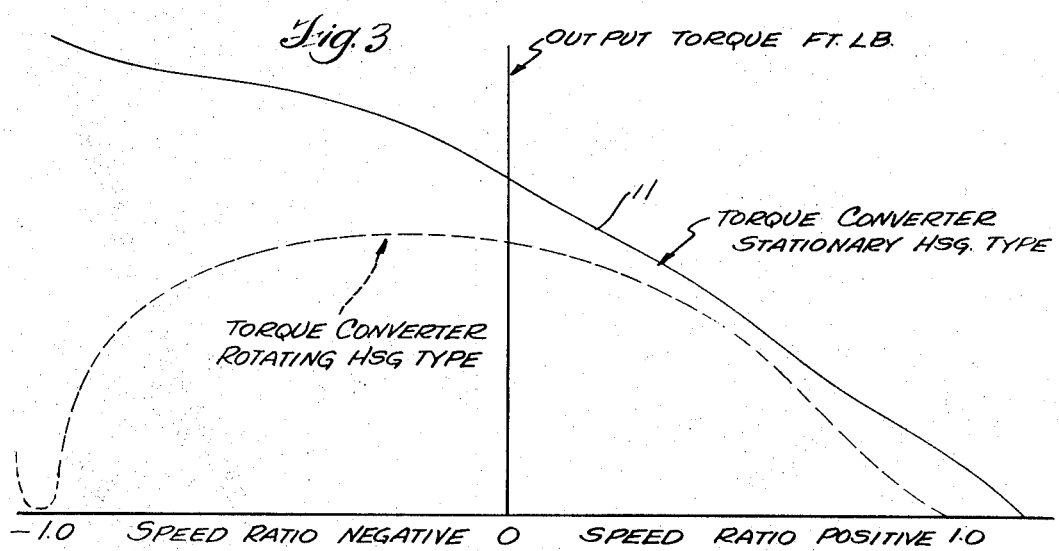
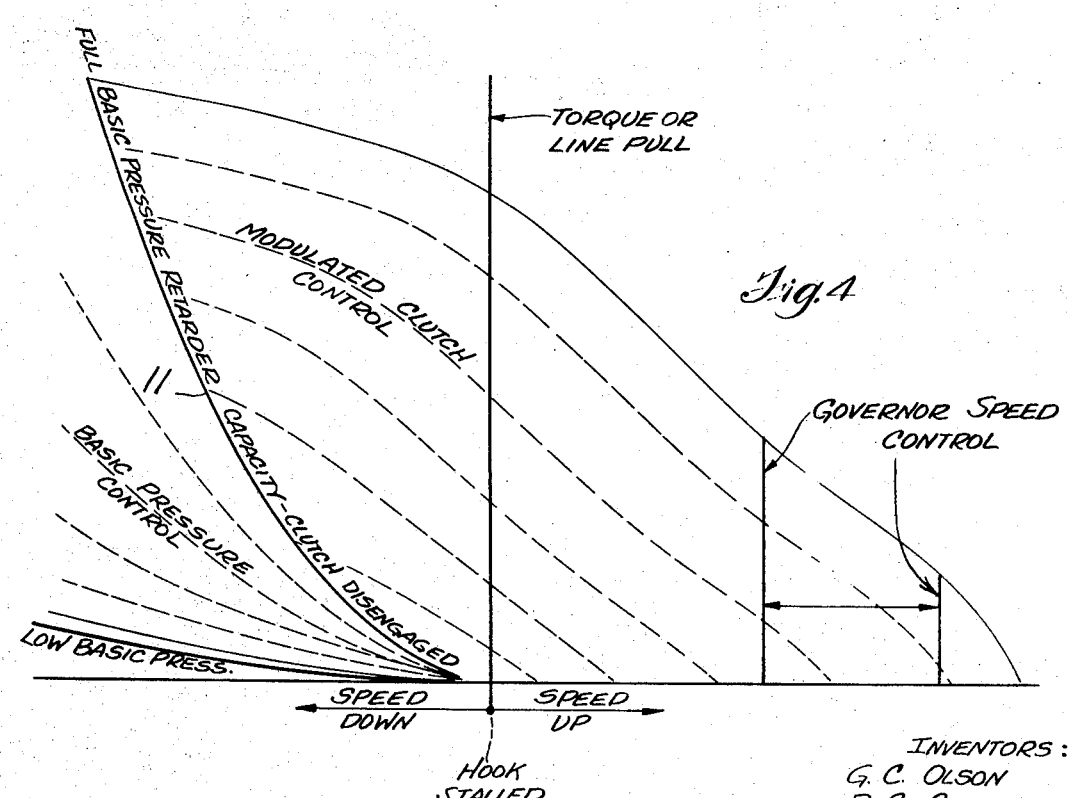

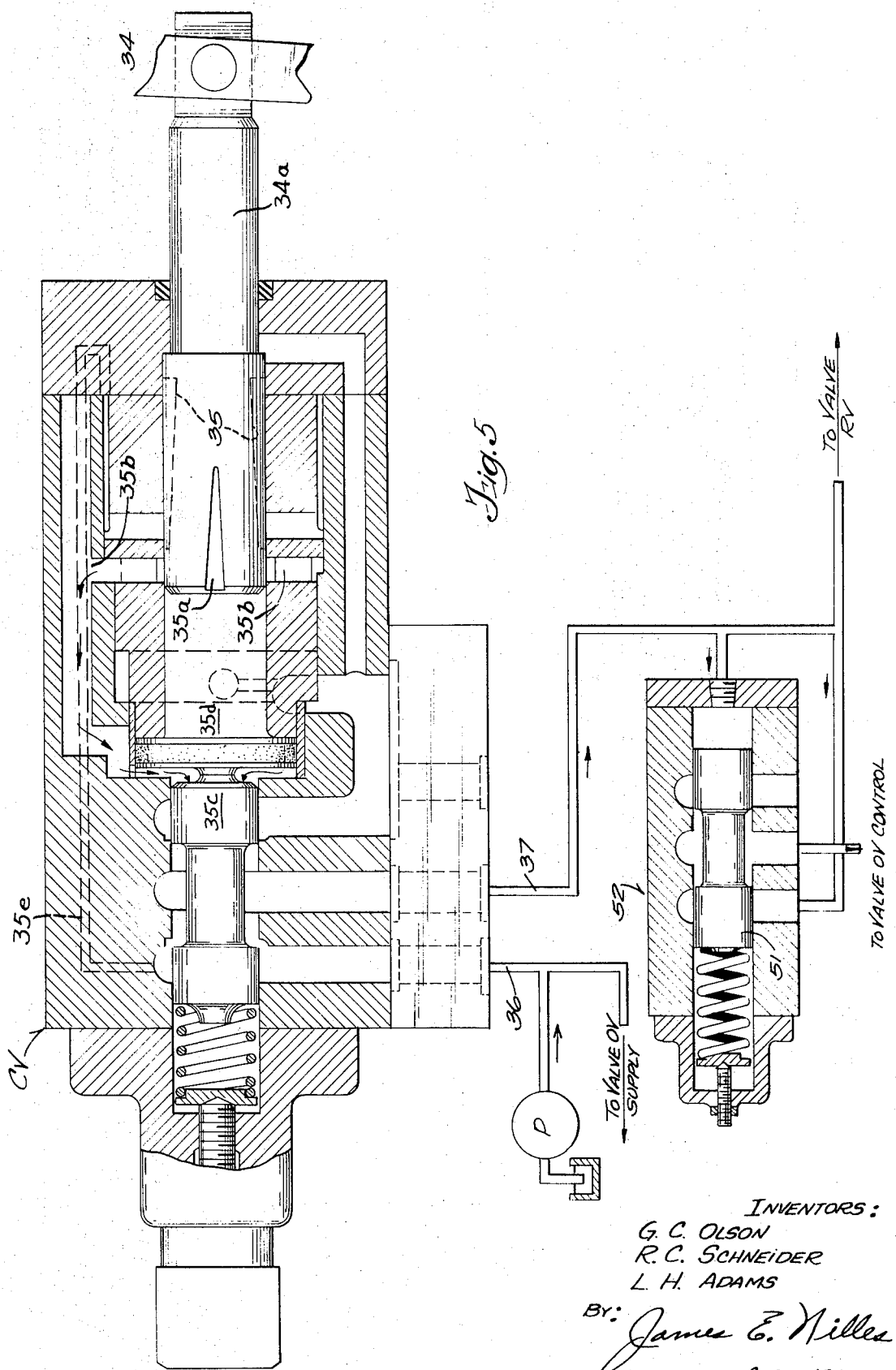

3,542,175

TORQUE CONVERTER AND CLUTCH WITH FLUID PRESSURE CONTROLS

BACKGROUND OF THE INVENTION

The invention pertains to a hydrodynamic transmission for a crane, winch, shovel or the like for controlling the lowering or falling load in a positive, rapid and accurate manner. The transmission includes a fixed stator, stationary housing torque converter and also a modulatable friction clutch ahead of the converter, and in which the internal pressure of the converter is controlled at a strategic location in the converter so as to reduce the retarding capacity of the converter, thereby permitting rapid lowering or dropping of the load and still being able to recover torque capacity of the converter in an extremely short time.

In crane work, transmissions are used to raise the loads and they must also be able to lower the load rapidly and under complete control of the operator. Hydrodynamic torque converters have been used for this type of work with some degree of success, but with limitations. For example, the rotation of the turbine wheel of the converter can be reversed and the speed of descent of the load can be regulated by varying the engine speed. However, many other functions of the crane must simultaneously be carried out, such as swinging of the upper part of the crane, booming in and out, and other functions, and in reducing engine speed, the response and operation of these other functions suffer accordingly.

Prior art cranes also have a drum clutch which permits the operator to disconnect the load from the transmission, thus permitting the load to drop freely, and the load is then caught by the drum brake before it hits the ground. This produces considerable heat conditions in the brake, and wear and strain on the brake and clutch systems in general.

Some prior art torque converters have used a mechanical ring valve to reduce its braking capacity.

Heretofore, one of the major problems hydrodynamic transmissions have encountered in work of the type to which the present invention pertains, is that the converter acts as a retarder when the rotation of the turbine is reversed, and converters having the greatest degree of control for lowering the load have also had the largest retarding capacity. Heretofore, with the clutch disengaged, the retarding effort of the torque converter is too great to permit sufficiently rapid lowering of a light load. If all fluid were dumped from the converter, the lowering speed would be increased, but the torque capacity of the converter could not be recovered fast enough to stop the fall.

SUMMARY

The present invention provides hydrodynamic transmission for crane work or the like, including a torque converter and modulatable friction clutch therefor, in which the retarding capacity of the converter is precisely controlled and capable of immediate response when additional retarding is required. More specifically, the invention provides means for reducing the retarding capacity of the converter by bleeding and reducing the internal pressure from a strategic location in the converter to thereby permit maximum lowering speed of the load; this internal pressure can be variably controlled from a very small value up to its standard operating pressure, thereby providing complete operator control; the full pressure in the converter can be recovered simultaneously, thereby recovering retarding torque capacity, slowing the falling load, or stopping when the clutch is engaged. The heat developed in this hydrodynamic device is continually pumped by the fluid to a cooler or radiator.

The modulatable clutch used in the present transmission provides regulation of the load speed in raising or lowering the load, by permitting the clutch to slip, or modulate, leaving the engine to operate at higher speeds for the other crane operations. This modulatable clutch is located ahead of the torque converter so as to limit the maximum heat load imposed on the clutch to about 15 percent of the horsepower which is capable of being absorbed by the torque converter.

BRIEF DESCRIPTION OF THE DRAWINGS

FIG. 1 is a hydraulic schematic diagram of a control system for a hydrodynamic transmission embodying the present invention;

FIG. 2 is a fragmentary, enlarged view of the clutch and converter shown in FIG. 1 and illustrating the permissible vent bleed off position in respect to the I.D. of the impeller.

FIG. 3 is a diagram showing the retarder characteristics for control lowering obtainable with a conventional stationary housing torque converter and with a conventional rotating housing torque converter.

FIG. 4 is a diagram showing a control characteristics obtainable with the present invention.

FIG. 5 shows a modified form of valve means for control of the modulated clutch.

DESCRIPTION OF A PREFERRED EMBODIMENT

The hydrodynamic transmission provided by the present invention includes a torque converter TC, having a stationary housing H, a modulatable, friction type clutch MC located ahead of the torque converter and which can be slippably engaged to achieve load raising and lowering control, a control valve CV for controlling the modulation of the clutch MC, a basic pressure valve BPV for controlling the basic pressure of the torque converter, and a low pressure regulator valve RV for controlling the pressure in the torque converter within the range of from zero to 45 p.s.i., for example. The transmission may also include a speed governor G which regulates the control of pressure fluid to the centrifugal, output control valve OV located in the fly wheel of the modulatable clutch, as will appear.

A more detailed explanation of the above elements will now be made before a general operational explanation of the system is disclosed.

Torque Converter

The torque converter TC usable with the present invention is of the broad range, stationary housing type, with inherent negative speed ratio braking capabilities. The retarding capacity of a conventional torque converter of this type is shown by curve 11 in FIGS. 3 and 4. As shown in FIG. 4, line 11 represents the problem involved by such a torque converter. That is, with the clutch disengaged, the retarding effort of the converter is too large to permit a reasonably rapid lowering of the load, particularly if the load is light. The lighter the load, the lower the speed of descent. FIG. 4 shows the control zone possible with the use of the modulated clutch, to be referred to.

The torque converter includes a fixed stator S which is rigidly fastened to the stationary housing H of the converter. The converter also includes the impeller I which is fixed to the converter input shaft 12, and a turbine T fixed to the turbine output shaft 13.

Cooling fluid is passed into and out of the converter circuit by conventional passage means 14 and passes through a heat exchanger 15 and then the cooled fluid is returned to the torque converter circuit, all in the known manner.

The torque converter also has a fluid inlet conduit 16 which receives fluid pressure from a pressure source, such as a pump 17, and in accordance with the action of the regulator valve RV and the torque converter basic pressure control valve BPC. The entering fluid pressure for providing basic pressure to the converter enters the torque converter circuit proper at a location back of the stator S, via passage 16a.

In accordance with the present invention, a bleed or vent orifice 20 is located so as to bleed fluid from the inlet passage 16a and direct it to atmosphere. This bleed off has been shown, for example, as being through orifice 20 in the housing, passage 20a in shaft 12 and then through port 20b of the clutch hub 21a fixed to shaft 12. Thus the inlet fluid may be passed through the clutch MC, to cool the clutch plates during full pressure operation.

The location of this bleed orifice 20 is particularly important and it should be located at a radius equal to 70 percent of the impeller vane I.D. up to 100 percent of impeller vane I.D., as indicated by the legends in FIG. 2. The orifice 20 also acts as a source of air inlet when low pressure severe cavitation is induced for low torque control. The size of the orifice 20 can affect the filling response time and must be sized in proportion to the main inlet pump supplying flow to fill the torque converter. Satisfactory response is obtained by using a 30 gallon per minute pump, a 9/32 inch orifice 20 in the converter that has a total fill of 4.8 gallons.

It has been found that locating this orifice or vent 20 at an I.D. greater than the above mentioned range, results in a poor response of the converter, more specifically, it increases the response time necessary to regain full control. On the other hand, with locating this vent orifice at a radius less than that indicated above, results in poor control of the converter; that is, a condition occurs in which the fluid will not vent properly and torque capacity is not reduced and held at a reliable control level.

Thus the vent orifice 20 is located at a strategic location behind the stator blades in the converter circuit, which permits rapid lowering and raising of the converter inlet pressure to enable retarding torque control from negligible to full capacity, for example say up to the 45 p.s.i. basic pressure maximum.

Modulatable Clutch

This modulatable or slippable clutch may be of the general type shown in the U.S. Pat. No. 3,352,395 issued Nov. 17, 1967 to C.R. Hilpert and which is assigned to an assignee common to with the present application. The clutch includes a fly wheel FW which is fixed to shaft 12, which fly wheel has a centrifugally-actuated spool-type valve OV located therein which maintains a constant output of the torque converter, through a governor to be described.

Referring more specifically to the valve OV, and as shown clearly in FIG. 2, it is spring biased, by spring 5, to the radial outward position and its shiftable spool has an annular groove 21 located between the land portions 22 and 23 of the valve spool. A fluid passage 24 extends from the piston actuating chamber 25 of the clutch and to the annular groove 21. An exit orifice 26 extends from the outer end of the valve bore 27 to the atmosphere. As will appear, this orifice acts to control or meter the outflow of fluid from the clutch chamber, when the valve spool move sufficiently in a radially outward direction to thereby cause the inner edge of the spool land 22 to move outwardly past the orifice, thereby opening it, Under this condition, the fluid is metered out of the chamber 25.

Pressure fluid is supplied to the piston actuating chamber 25 from the fluid pump P, through passage 28 in the housing, passage 28a in the shaft 12 and then through passage 28b in the fly wheel. It should also be noted that a restriction or orifice 28c is located in the fluid supply passage, such as in passage 28b, so as to meter or limit the otherwise free flow of pressure fluid to the clutch actuating chamber 25. By so restricting flow and preventing an unlimited supply to the actuating chamber 25, the exit orifice 26 at the radially outer end of the valve OV can handle the flow and properly perform its fluid exit metering function.

An orifice 29 is also provided between the inner end of the valve spool and the atmosphere, thus venting the inner end of the valve bore. This orifice is formed in a threaded plug, in the conventional manner.

Thus a source of constant pressure fluid is furnished by the pump P to the clutch apply chamber 25.

A separate source of clutch control fluid pressure is introduced into the clutch via conduit 31 through a governor G (to be referred to presently), passage 31a in the housing, annular groove 31b, passage 31c in the shaft 12, passage 31d in the flywheel, and to the radially outer end of the valve spool.

The clutch piston 32 extends in accordance with the amount of pressurization of the expansible chamber 25 to cause the desired degree of clutch plate clamp up, thus providing the degree of clutch slip desired, or full engagement between the engine E and the impeller 1 of the torque converter.

The modulatable clutch provides an infinite variation of available power for raising, lowering, or holding the load on the crane, and results in stepless speed control.

As will more fully appear, the centrifugal, output control valve OV is biased 40 p.s.i. which requires the pressure in the system to be raised to 40 p.s.i. before the clutch MC begins to engage.

By providing such a modulatable clutch ahead of the torque converter, the load speed can be regulated to lower, raise, or hold the load by merely permitting the clutch to slip. This allows the engine E, which drives the clutch, to operate at higher speeds and consequently the accessories (not shown) also driven by the engine, such as the swing mechanism and other hoist mechanism (not shown) are more responsive.

Governor

The output control valve OV in the modulatable clutch MC is regulated by the speed governor G which functions to regulate the amount of fluid being admitted via conduit 31 to this centrifugal, output control valve OV. The governor setting can be adjusted hydraulically to give variable pressure control, but is shown as being adjusted manually, for example by the handle 33 to some preselected maximum desired deck machinery speed. The governor under these conditions overrides the manual operation of the modulated clutch control valve CV, which will be referred to in detail. Deck machinery maximum speed can be limited manually by the operator by permitting the modulatable clutch to slip.

The governor may be of a conventional type and is indicated to be a centrifugally controlled governor known commercially as the Woodward SG Governor made by the Woodward Governor Company of Rockford, Illinois. This governor is connected to the output shaft 13 of the converter TC, by a chain drive 33a for example, and it directly controls the output valve OV in the modulating clutch MC, by controlling pressure of fluid in conduit 31 to the radially outer end of the valve, to provide a constant output speed of the converter.

In use with the present invention, in crane or shovel transmissions for example, the governor G is used as a device to limit the deck machinery speed to some predetermined value, and as previously indicated is set manually or hydraulically to some predetermined maximum deck machinery speed.

The governor drive shaft 34 has a back stop freewheel 34a to prevent the governor from limiting the pressure to the valve OV during load lowering giving the operator full control of the clutch when desired for stopping the fall.

Control Valve for Modulated Clutch

This valve CV is manually operated by the lever 34 whose movement causes variation in the pressure in the clutch of from zero to 200 p.s.i. by means of the tapered slots 35 which form variable orifices that are built into the valve CV. This variable orifice type spool valve controls the flow of fluid pressure from the main pressure source, such as fluid pump P, and via conduit 36 to valve CV and then conduit 37 conducts pressure fluid, when lever 34 is so adjusted, from the valve CV to the output governor G and to the regulator valve RV, to be described.

This valve is shown in the closed or zero pressure position. The two diametrically opposed slots 35a, which are tapered in the other direction, act to vent chamber 35b to the sump via passage 35d. The slots 35 are closed by the land of the spool. As the valve stem is move to the left (as viewed in the drawings), the slots 35 open that is, the orifices formed thereby become larger and the pressure increases to chamber 35b. Main pressure is admitted via passage 35e to slots 35. As the stem continues to move to the left, slots 35 progressively open, due to their taper, thereby providing greater pressure to chamber 35 b. Fluid flow is indicated by the arrows in FIG. 5. Other slots 35a, tapered in the opposite direction, are closing more as the stem moves to the left, and they are completely closed at full stem movement to the left, thereby assuring full line pressure in chamber 35b to act on the right end of spool 35c. Stated otherwise, as the spool 34a is moved to the left, the sump slots 35a are gradually closing and main pressure slots 35 are gradually opening to communicate with the chamber 35b. Thereby as slots 35a are closed and thereby close off chamber 35b from the sump, slots 35 have opened the main pressure to chamber 35b.

Lever 34 first acts to raise the pressure from zero in the torque converter to 45 p.s.i. for example, which assume is the maximum operating basic pressure desired in the torque converter. This raise of pressure occurs during the first or initial movement of the lever 34. Further movement of the lever actually starts to engage the modulating clutch MC and causes it to be actuated from a completely disengaged position to a fully engaged position. The centrifugal valve OV in the flywheel of the clutch MC, as previously mentioned, is biased by its spring s at 40 p.s.i. which requires the pressure in the system to be raised to 40 p.s.i. before the clutch MC will begin to engage.

Regulator Valve

A regulating valve RV is provided between the modulated clutch control valve CV and the fluid pressure line 16 which charges the torque converter. The valve RV is for the purpose of providing converter basic pressure control from zero to 45 p.s.i.

It has been found that the majority of the control of torque by the basic pressure actually occurs in the range of from zero to about 10 p.s.i., and that from 10 p.s.i. to about 45 p.s.i., only a slight increase of control is obtained. By means of this regulator valve, which is in effect a slave valve, it is possible to make the control more controllable in the control pressure range of zero to 10 p.s.i. If it is necessary to control the torque converter basic pressure across the full range of zero to about 45 p.s.i., pilot spool 42 can be dispensed with. Referring now to the construction and operation of the valve RV, (FIG. 1), the pump 17, which picks up fluid from the sump and passes it through a heat exchanger 38, also delivers pressure fluid via conduit 16 to the inlet passage 16a of the torque converter. The valve RV has a shiftable spool 40 having a large area end 41 on which fluid pressure from pump 17 acts. The spool 40 also has a small area end 42, say for example, about one-quarter of the area of that of the large end 41. Thus a large pressure is present in line 37 and at the smaller control end of valve RV for adjusting or setting by the operator, while a pressure about one-fourth as great is present at the other, larger end of valve RV. When the control valve CV pressure reaches about 45 p.s.i., at which time converter pressure is about one-quarter of that—say 11 p.s.i.—the fluid passes through the opening formed at 43, passage 44 and acts on the end 45 of the spool and rapidly pushes the spool to the left (as viewed in the drawing), quickly boosting the pressure at the larger end 41 to about 45 p.s.i., the maximum desired for the torque converter.

In this manner, the pressure regulating control valve RV expands from one to about 45 P.s.i., permits more accurate control, and then closes and reaches a positive stop so as to enable the control valve CV to control the pressure from about 40 to about 200 psi. in the clutch MC.

Stated otherwise, when the maximum desired pressure of 45 p.s.i. has been reached and is being delivered by the pump 17 to the torque converter TC as determined by the regulating valve RV, the latter is closed and the basic pressure control valve BPV takes over control of the basis pressure for the converter, the valve BPV acting as a relief valve set to dump at about 45 p.s.i.

As mentioned, movement of the hand lever 34 in its second stage of movement, actually starts to engage the modulating clutch MC and takes it from the disengaged to the fully engaged position. Thus the single lever 34 of control valve CV is capable of controlling the basis pressure for the torque converter, and also controls the modulating clutch, in proper sequence. The system is capable of simultaneous application of both basic pressure of the torque converter and modulating clutch pressure so as to be able to catch a falling load.

FIGURE 5 Modification

Alternative means may be provided for biasing the spool of valve OV, other than the use of the spring s. For example, a spring returned spool 51 of valve 52 may provide the basic pressure control up to the 40 p.s.i. before the modulated clutch begins to engage. This arrangement is shown in FIG. 5 wherein the valve 52 is connected to the previously described control valve CV, output valve OV of the clutch MC, and the low-pressure regulator valve RV.

Resume

As mentioned, the single lever 34 of the control valve provided for both torque converter basic pressure and modulated clutch control, also insures that where a light load on the crane is permitted to drop freely with the torque converter basic pressure at a minimum of 1 to 2 p.s.i. the load can be gently braked against the hydrodynamic retarder by gradually applying basic pressure and then finally engaging the clutch and applying sufficient torque capacity to stop the load. IN the event that a very rapid stopping of the load is required, it is possible in this system to not only move the lever calling for full basic pressure in the torque converter, but immediately proceed onward and call for a partial clutch apply pressure. Experience has shown that it is possible to have the clutch partly engaged before the pressure was fully raised to the 45 p.s.i. basic pressure in the converter, allowing an extremely fast stop as desired by the operator.

We claim:

1. A hydrodynamic transmission comprising: a stationary housing type torque converter having a stationary housing, an impeller, a turbine and a stator fixed to said housing; a hydraulically actuated friction plate type clutch driven by a source of power and connected to and driving said converter, a pressure fluid inlet passage for said torque converter, an adjustable control valve for controlling the flow of pressure fluid (1) to said torque converter from a pressure fluid source, and (2) to said hydraulically actuated clutch; and a bleed vent in said inlet passage for bleeding inlet pressure from said converter to thereby decrease the retarding characteristic of the converter when the rotation of said turbine is reversed.

2. The transmission as set forth in claim 1 further characterized in that said bleed vent is located in the torque converter at a location of about from 70 percent to 100 percent of the internal diameter of said impeller.

3. A hydrodynamic transmission comprising: a stationary housing type torque converter having a stationary housing, an impeller, a turbine and a stator fixed to said housing; a hydraulically actuated, modulatable friction plate type clutch driven by a source of power and connected to and driving said converter, a pressure fluid inlet passage for said torque converter, said clutch having a hydraulically controlled valve for maintaining the output speed of the converter constant by varying the amount of friction plate clamp up and consequent slipping of the modulatable clutch; and adjustable control valve for controlling the flow of pressure fluid (1) to said torque converter from a pressure fluid source and (2) to said hydraulically controlled valve; and a bleed vent in said inlet passage for bleeding inlet pressure from said converter to thereby decrease the retarding characteristic of the converter when the rotation of said turbine is reversed.

4. The transmission as set forth in claim 3 further characterized in that said bleed vent is located in the torque converter at a location of about from 70 percent to 100 percent of the internal diameter of said impeller.

5. A hydrodynamic transmission comprising; a stationary housing type torque converter having a stationary housing, an impeller, a turbine and a stator fixed to said housing; a hydraulically actuated, modulatable friction plate type clutch driven by a source of power and connected to and driving said converter, said clutch having a hydraulically controlled valve for maintaining the output speed of the converter constant by varying the amount of friction plate clamp up and consequent slipping of the modulatable clutch, a regulating valve, a speed sensitive governor associated with the output of said converter and in pressure fluid directing communication with said hydraulically controlled valve, an adjustable control valve for controlling the flow of pressure fluid (1) to said torque converter through an inlet passage in said converter and from a pressure fluid source and under the influence of said regulating valve and (2) to said hydraulically controlled valve via said governor; and a bleed vent for bleeding inlet pressure from said inlet passage of said converter to thereby decrease the retarding characteristic of the converter when the rotation of said turbine is reversed.

6. A The transmission as set forth in claim 5 further characterized in that said bleed vent is located in the torque converter at a location of about from 70 percent to 100 percent of the internal diameter of said impeller.